United States Patent [19]
Bowen et al.

[11] Patent Number: 4,874,218
[45] Date of Patent: Oct. 17, 1989

[54] REVERSIBLE OPTICAL SWITCH

[75] Inventors: Terry P. Bowen, Etters; Sherry J. Harms, Hummelstown; John C. Hoffer, Harrisburg, all of Pa.

[73] Assignee: AMP Incorporated, Harrisburg, Pa.

[21] Appl. No.: 221,059

[22] Filed: Jul. 19, 1988

[51] Int. Cl.$^4$ .............................................. G02B 6/36
[52] U.S. Cl. ............................... 350/96.20; 350/96.15; 350/96.21
[58] Field of Search ............... 350/96.13, 96.15, 96.16, 350/96.18, 96.20, 96.21

[56] References Cited

U.S. PATENT DOCUMENTS

| 4,148,558 | 4/1979 | Schuck | 350/96.20 |
| 4,401,365 | 8/1983 | Mizokawa et al. | 350/96.20 |
| 4,650,278 | 3/1987 | Maciejko et al. | 350/96.20 |
| 4,715,673 | 12/1987 | Noro et al. | 350/96.20 |
| 4,789,215 | 12/1988 | Anderson et al. | 350/96.20 X |

FOREIGN PATENT DOCUMENTS

| 0048867 | 4/1982 | European Pat. Off. | 350/96.20 |
| 0096615 | 12/1983 | European Pat. Off. | |
| 56-111807 | 9/1981 | Japan | 350/96.13 |
| 57-186704 | 11/1982 | Japan | 350/96.13 |
| 58-117504 | 7/1983 | Japan | 350/96.13 |
| 60-73516 | 4/1985 | Japan | 350/96.13 |
| 8802869 | 4/1988 | World Int. Prop. O. | |

OTHER PUBLICATIONS

Patent abstracts of Japan, vol. 11, No. 311, (P-625)[2758], 10/12/87 & Jp-A-62 102 219, (Toshiba Corp.), 12/05/87.
Patent abstracts of Japan, vol. 7, No. 204 (E197)[1349], 9-9-83 & JP-A-58 101 536.
Patent abstracts of Japan, vol. 11, No. 298, (P-620)[2745], 9-26-87 & JP-A-62 90 613, (Toshiba Corp.).

Primary Examiner—John D. Lee

[57] ABSTRACT

A reversible optical switch which allows a node to be inserted into or removed from a fiber optic network is disclosed. In a first state, the switch of the present invention provides a path between an incoming optical fiber and the node receiver and a path between the node transmitter and an outgoing optical fiber. In a second state, the switch connects the incoming and outgoing fibers, so that the network bypasses the node and connects the transmitter and receiver so that the bypassed node can be tested.

7 Claims, 4 Drawing Sheets

REVERSIBLE OPTICAL SWITCH

FIELD OF THE INVENTION

The present invention relates to an optical switch which enables a node to be inserted into or removed from a fiber optic local area network.

BACKGROUND OF THE INVENTION

Fiber optic local area networks are typically implemented in a ring configuration. Such a network comprises a plurality of nodes arranged in a ring, the nodes being interconnected by optical fibers.

To transmit information from an originating node to a destination node, the data is transmitted from the originating node along the ring from one intervening node to the next until the destination node is reached. Illustratively, information arrives at a node via an incoming optical fiber. The incoming optical fiber is coupled to a receiver which converts the incoming information signal from optical to electrical form. Information leaves a node via an optical transmitter which converts a signal from electrical to optical form, the optical signal being transmitted out from the node via an outgoing optical fiber.

One problem with a fiber optic local area network having a ring configuration is that if one node fails the entire network or a significant portion thereof will be nonusable as no information can pass through a failed node. Accordingly, it is an object of the present invention to provide a reversible optical switch which in one state couples a node into a ring like optical network and which in a second state allows a node to be bypassed so that the network can continue to function in the event of a node failure.

In the event of a node failure or suspected node failure, it is desirable for a node to be tested by enabling the transmitter in the node to communicate via an optical path with the receiver in the node. Accordingly, it is a further object of the invention to provide a switch which, in a first state, couples a node into a ring like fiber optic network and which, in a second state, allows the node to be bypassed by the network, while simultaneously optically coupling the node transmitter to the node receiver to permit testing of the bypassed node.

In present implementations, the transmitter and receiver portions of a node are combined to form a single transceiver unit. The transceiver unit is connected to an interconnect housing by way of a duplex connector which enters the interconnect housing at one side thereof. The incoming and outgoing fibers are illustratively terminated in separate simplex connectors which enter the interconnect housing on a side opposite to that of the duplex connector of the transceiver. Accordingly, it is a further object of the present invention to provide a reversible optical switch coupled to the interconnect housing which, in a first state, provides substantially straight throughgoing optical paths to enable the incoming fiber to be coupled to the node receiver and the outgoing fiber to be coupled to the node transmitter. In a second state, the switch should provide a first "loop back" optical path that couples the incoming and outgoing fibers so that the transceiver is bypassed by the network and a second "loop back" optical path that couples the transmitter and receiver so that the bypassed node can be tested.

SUMMARY OF THE INVENTION

The present invention is a reversible optical switch. In a first state, the switch serves to insert a node into a fiber optic network having a ring like configuration. In a second state, the switch serves to remove the node from the network and enables the network to bypass the removed node. In its second state, the switch also provides an optical path between the transmitter and receiver of the removed node, so that the removed node can be tested.

More particularly, at any given node there is an incoming optical fiber which couples the given node with the adjacent upstream node in the ring like network and there is an outgoing optical fiber which couples the given node with the adjacent downstream node in the network. The given node also includes an optical receiver and an optical transmitter. In its first state, the switch of the present invention couples the incoming fiber to the receiver and the outgoing fiber to the transmitter. In its second state, the switch of the present invention couples the incoming fiber to the outgoing fiber so that the node is bypassed by the network. In its second state, the switch also provides an optical path between the transmitter and receiver so that the node can be tested.

In an actual implementation of a ring like fiber optic network the incoming and outgoing fibers are connected to a node as follows. The incoming and outgoing fibers are terminated in a duplex connectors or, alternatively, a pair of simplex connectors which enter an interconnect housing on one side thereof. The receiver and transmitter of the node form a single transceiver unit which is provided with a duplex connector. The switch of the present invention may be formed as a unit located directly between the interconnect housing and the node transceiver. Thus, the switch unit receives the duplex connector of the transceiver on one side and on the opposite side is connected to the interconnect housing. The switch unit is connected to the interconnect housing on the side of the interconnect housing opposite from that of the incoming and outgoing optical fibers. Accordingly, in its first state, the optical switch of the present invention provides a first substantially straight through going path (e.g., a path that goes straight through the interconnect housing and switch unit) which enables the incoming fiber to be connected with the receiver and a second substantially straight throughgoing path which enables the outgoing fiber to be connected with the transmitter. Illustratively, the throughgoing paths may be formed using lenses. In its second state the switch provides a first loop back optical path between the incoming and outgoing fibers so the node may be bypassed by the network and a second loop back optical path between the transmitter and receiver so that the node can be tested. The loop back paths may be provided using parabolic reflector systems, waveguides, or bent optical fiber segments.

In an alternative embodiment of the invention there is no distinct switch unit, but instead the switch is formed integrally with the interconnect housing. In this case, the incoming and outgoing fibers enter one side of the interconnect housing and the duplex connector of a node transceiver enters the opposite side of the interconnect housing. In this embodiment the throughgoing paths extend from one side of the interconnect housing through to the opposite side and the loop back paths enter and leave the interconnect housing on the same side.

BRIEF DESCRIPTION OF THE DRAWINGS

FIG. 1 also illustrates the optical paths that are provided by the switch of the present invention in its first and second states.

DETAILED DESCRIPTION OF THE INVENTION

Figure 1:
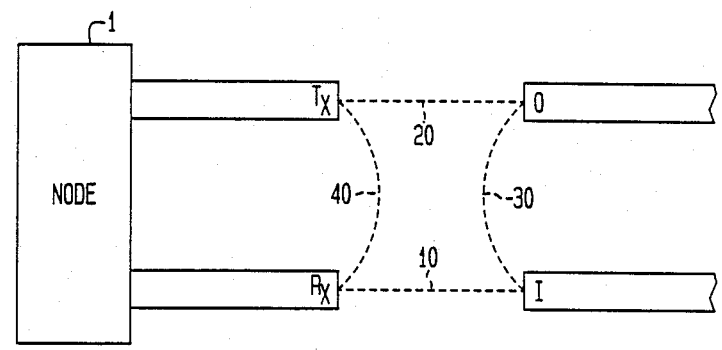
FIG. 1 schematically illustrates the arrangement of a node transmitter and receiver and the incoming and outgoing optical fibers.

Turning to FIG. 1, Tx and Rx indicate the transmitter and receiver of a node 1 which illustratively forms part of a ring like optical fiber network. Alternatively, Tx and Rx may indicate short optical fiber leads connected to the transmitter and receiver of the node 1. O and I designate the outgoing and incoming optical fibers which connect the node 1 to the adjacent downstream and upstream nodes in the network. In FIG. 1, the incoming and outgoing fibers on the one hand, and the transmitter and receiver on the other hand, are arranged opposite one another. As indicated above, the reason for this is the geometry of the interconnect housing (not shown in FIG. 1) which actually serves to interconnect the transmitter and receiver with the outgoing and incoming fibers. In particular, the incoming and outgoing fibers are located on one side of the housing and the transmitter and receiver are located on the opposite side.

As indicated above, the switch of the present invention has a first state which provides an optical path between the incoming fiber and the receiver and an optical path between the outgoing fiber and the transmitter. Thus in its first state the switch of the present invention must provide for the substantially straight throughgoing paths 10 and 20 of FIG. 1. In its second state, the switch of the present invention provides an optical path between the incoming and outgoing fibers so that the network can bypass the node 1. In its second state, the switch also provides a path between the transmitter and receiver of the node so that the node can be tested. Thus in its second state, the switch of the present invention provides the loop back optical paths 30 and 40 of FIG. 1.

Figure 2:
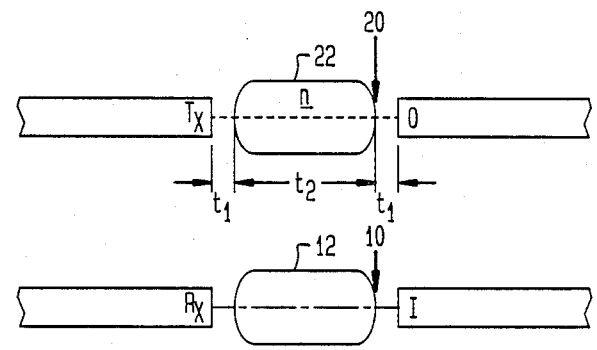
FIG. 2 schematically illustrates the operation of the switch of the present invention in its first state.

FIG. 2 indicates how a switch of the present invention can form the substantially straight throughgoing paths 10 and 20. In FIG. 2, the paths 10 and 20 are formed by means of the lenses 12 and 22 respectively.

Figure 3A:
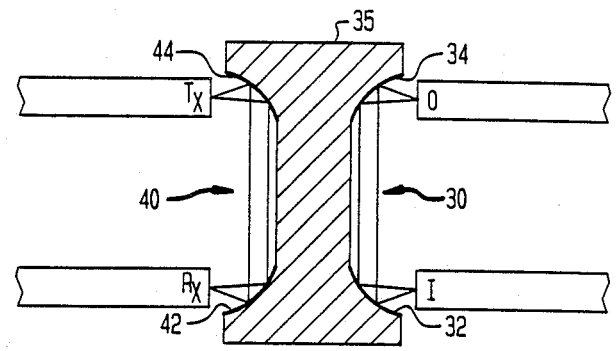
FIGS. 3A, 3B, and 3C schematically illustrate the operation of the switch of the present invention in its second state.
Figure 3B:
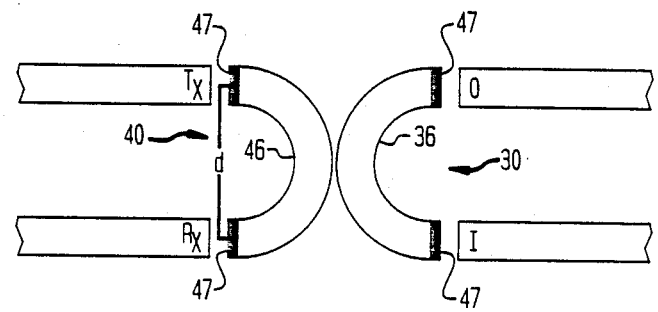
Figure 3C:
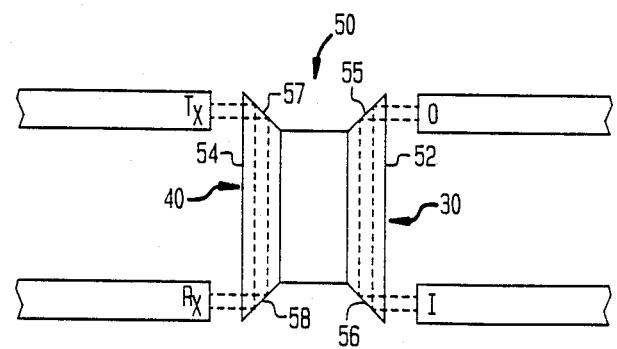

FIGS. 3A, 3B and 3C schematically illustrate three alternative mechanisms that can be used by the inventive switch to form the paths 30 and 40.

In FIG. 3A, the paths 30 and 40 are provided by parabolic reflectors. In particular, the path 30 is provided by the parabolic reflectors 32 and 34 which are mounted on the support 35. Similarly, the path 40 is provided by the parabolic reflectors 42 and 44 which are also mounted on the support 35. The path 30 is created as follows. Light exiting from I is reflected 90° by the parabolic reflector 32 and is collimated. The collimated radiation travels to the parabolic reflector 34. This radiation is then reflected 90° into O. Similarly, the path 40 is created as follows. Light exiting from Tx is reflected 90° by the parabolic reflector 44 and is collimated. The collimated light travels to the parabolic reflector 42 and is then reflected 90° into Rx.

One problem with the arrangement of FIG. 3A is that if the separation between Tx and Rx and between I and O is relatively large, the collimation has to be almost perfect for the device to function. Thus, the particular mechanism of FIG. 3A for providing the loop back paths 30 and 40 may not be practical in systems where the distance between Tx and Rx and the distance between I and O is on the order of 0.5 to 0.75 inches. This problem may be corrected by putting optical waveguides, such as graded index rods in between the parabolic reflectors along the paths 30 and 40. Alternatively, antireflective coatings may be on the reflectors.

In an alternative embodiment, the paths 30 and 40 may be formed using bent optical fiber segments. Such bent optical fiber segments 36 and 46 are illustrated in FIG. 3B. Relatively low loss may be achieved if the end faces of the fiber segments 36 and 46 are coated with antireflection coatings 47 and the bending radii of the fiber optic segments 36 and 46 are as large as possible. In addition, losses can be further minimized if the end faces of the fiber segments are positioned as close as possible to the end faces of Tx, Rx, I and O. This embodiment of the invention is useful when there is a relatively large spacing between Tx and Rx and between I and O such as when these separations are 0.5 or 0.75 inches.

A third mechanism for providing the loop back paths 30 and 40 is shown in FIG. 3C. In particular, the structure 50 defines two waveguides 52 and 54 each having oppositely disposed slanted end faces 55, 56 and 57, 58. Radiation from Tx reflects off the end face 57, propagates along the waveguide 54 and reflects off of end face 58 to Rx. Similarly, radiation from I reflects off end face 56, propagates down the waveguide 52 and reflects off of end face 55 into O.

The structure 50 is formed on an optical quality glass substrate. The waveguides 52 and 54 may be constructed by forming the beveled or slanted end faces 55, 56, 57 and 58 before or after using an ion exchange process to create the waveguide channels between the beveled end faces. Such waveguides are available from Corning Glass Works and Nippon Sheet Glass Co.

Figure 4:
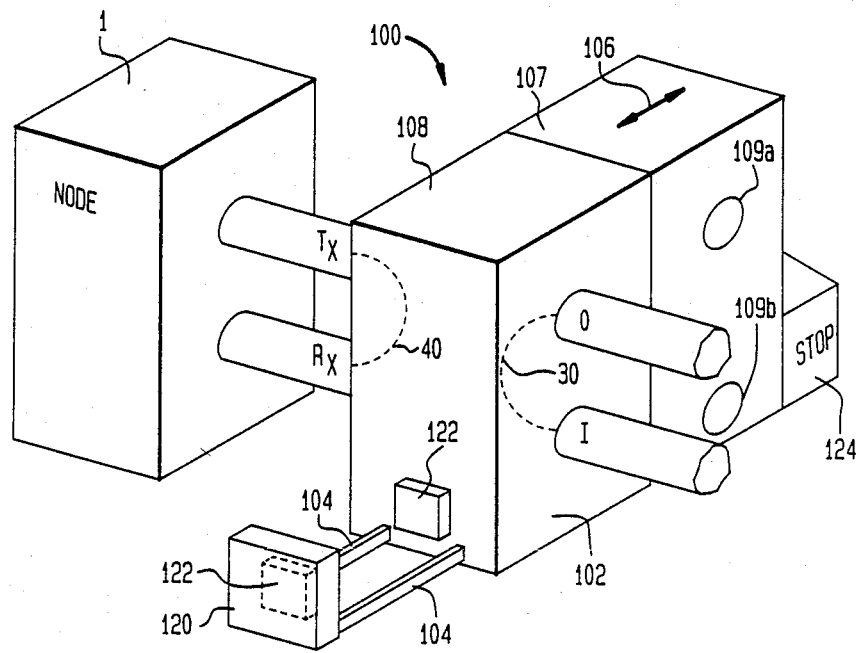
FIG. 4 schematically illustrates how the switch of the present invention is switched between its first and second states.

Turning to FIG. 4, a switch 100 in accordance with the present invention is schematically illustrated. In a first state, the switch 100 provides a straight throughgoing path between Tx and O and a straight throughgoing path between I and Rx. In its second state, the switch 100 provides a loop back path 40 between Tx and Rx and a loop back path 30 between I and O.

In the illustrative embodiment of the invention shown in FIG. 4, the switch 100 comprises an assembly 102 which is mounted on a guiding means such as guide rails 104 for movement along the axis indicated by the double headed arrow 106. The assembly 102 is divided by a partition into two compartments 107, 108. The lenses 22 and 12 are located in the compartment 107 for providing the straight throughgoing paths 10, 20. The waveguides 52 and 54 are located in the compartment 108 for providing the loop back paths 30 and 40. (Note in some embodiments of the invention, the partition between compartments may be omitted.) Normally, the assembly 102 is positioned so that the compartment 107 is between Tx and Rx on one side and O and I on the opposite side. In this case, the node 1 is inserted into the fiber optic network (not shown in FIG. 4.) The openings 109a, 109b show where radiation from and to I and O would enter or leave the compartment 107. Similar openings on the opposite side of the compartment 107 are provided for Tx and Rx.

To remove the node 1 from the network, the solenoid 120 is activated. The magnetic field produced by the solenoid interacts with the magnet 122 to push the assembly along the rails 104 until the stop 124 is reached. The magnet 122 is mounted on the assembly 102 and the solenoid 120 is mounted on the support structure 123. As shown in FIG. 4, when the assembly is in this position the waveguides inside the compartment 108 are positioned to form the paths 30 and 40 between I and O and between Tx and Rx so that the node 1 is bypassed by the network and so that the node 1 may be tested using Rx and Tx.

Figure 5A:
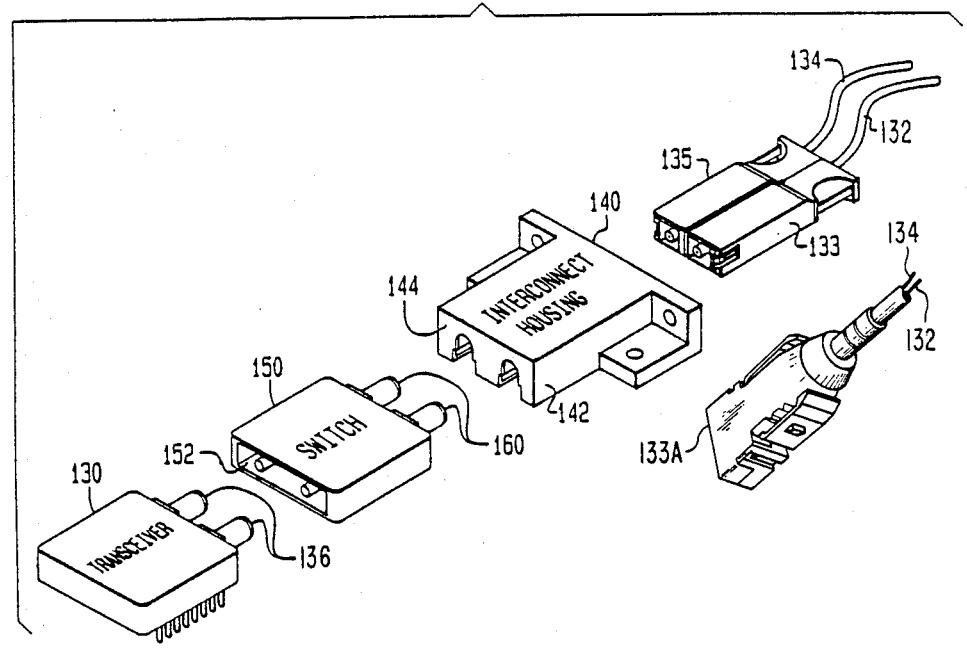
FIGS. 5A and 5B schematically illustrate an actual interconnection of a node transceiver and the incoming and outgoing optical fibers by means of the switch of the present invention.
Figure 5B:
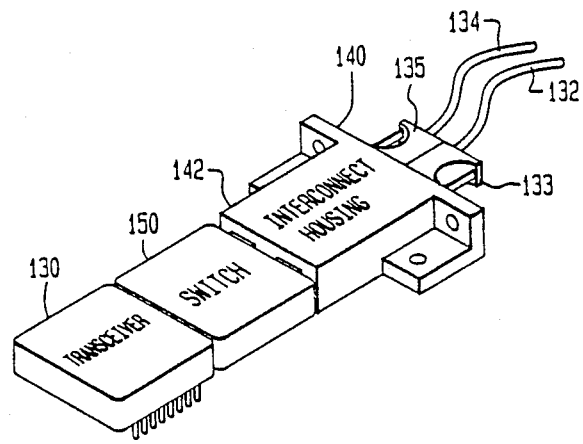

FIGS. 5A and 5B schematically illustrate an actual connection between a transceiver 130 (which comprises a transmitter and a receiver) and the incoming and outgoing optical fibers of a network. FIG. 5A shows the components used to form the connection in unassembled condition while FIG. 5B shows the components after assembly.

As shown in FIG. 5 the incoming and outgoing fibers form part of incoming and outgoing cables 132 and 134 respectively. These cables are terminated in simplex connectors 133 and 135 which are inserted into side 140 of an interconnect housing 142. Alternatively, the cables are terminated in a duplex connector 133A which is constructed for insertion into side 140 of the interconnect housing 142. The interconnect housing and the simplex and duplex connectors are described in U.S. Pat. No. 4,687,291.

The unit 150 contains the switch of the present invention. The unit 150 is connected by means of a duplex connector 160 to the side 144 of the interconnect housing which is opposite to the side 140. The transceiver unit 130 also includes a duplex connector 136 which is received in the switch 150 on a side 152 oppositely disposed from the interconnect housing 142.

Thus, as discussed previously, to insert the transceiver into the network the switch of the present invention provides straight throughgoing paths between the cables 132 and 134 and transceiver 130. To remove the transceiver from the network the switch provides a loop back path between the transmitter and receiver of the transceiver 130 and a loop path between the cables 132 and 134. In an alternate embodiment of the invention, the distinct switch unit 150 is eliminated and the switch is formed integrally with the interconnect housing.

Finally, the above described embodiments of the invention are intended to be illustrative only. Numerous alternative embodiments may be devised by those skilled in the art without departing from the spirit and scope of the following claims.

We claim

1. An optical switch comprising, a first pair of optical fibers for alignment with an optical coupling, a second pair of optical fibers for alignment with an optical coupling, a first optical coupling for coupling optical fibers of the first pair to corresponding optical fibers of the second pair, a second optical coupling for coupling the optical fibers of the first pair to each other and for coupling the optical fibers of the second pair to each other, and a mechanized assembly for aligning either the first or the second optical coupling with the corresponding optical fibers, wherein the improvement comprises;
the optical fibers of the first pair are aligned with corresponding duplex connectors of a transceiver, and the optical fibers of the second pair are aligned with one end of an interconnect housing having a second end into which are pluggably received a corresponding connector for optical cable in alignment with the duplex connectors and corresponding optical fibers of each pair,
a solenoid for moving the mechanized assembly,
the mechanized assembly includes lenses aligned with corresponding optical fibers of each pair, and
the mechanized assembly includes a pair of waveguides with looped optical paths, each of the looped optical paths being in alignment with a corresponding pair of optical fibers upon movement of the mechanized assembly by the solenoid.

2. An optical switch as recited in claim 1, wherein the improvement comprises; the lenses and the pair of waveguides are mounted along guide rails, a stop means is provided at one end of the guide rails for stopping motion of the lenses and the waveguides along the guide rails, and the solenoid is at the opposite end of the guide rails.

3. An optical switch as recited in claim 1, wherein the improvement comprises;
the assembly includes a permanent magnet facing the solenoid and moveable along guide rails with the lenses and the waveguides.

4. An optical switch as recited in claim 1, wherein the improvement comprises;
each of the waveguides is a reflector with two parabolic reflecting surfaces.

5. An optical switch as recited in claim 1, wherein the improvement comprises;
each of the waveguides is a glass substrate having waveguide channels between beveled end faces.

6. An optical switch as recited in claim 1, wherein the improvement comprises;
each of the waveguides is an optical fiber.

7. An optical switch as recited in claim 1, wherein the improvement comprises;
the corresponding optical cable provides an input optical fiber and an output optical fiber aligned with the corresponding fibers of each pair, and the input optical fiber is connected to the output optical fiber by a corresponding waveguide.

* * * * *